United States Patent
Gautreau

(10) Patent No.: US 11,801,809 B2
(45) Date of Patent: Oct. 31, 2023

(54) WHEELCHAIR WHEEL CLEANING ASSEMBLY

(71) Applicant: Corey Gautreau, Gonzales, LA (US)

(72) Inventor: Corey Gautreau, Gonzales, LA (US)

( * ) Notice: Subject to any disclaimer, the term of this patent is extended or adjusted under 35 U.S.C. 154(b) by 435 days.

(21) Appl. No.: 17/177,969

(22) Filed: Feb. 17, 2021

(65) Prior Publication Data

US 2022/0258698 A1    Aug. 18, 2022

(51) Int. Cl.
  *B60S 1/68* (2006.01)
  *A61G 5/10* (2006.01)
(52) U.S. Cl.
  CPC . *B60S 1/68* (2013.01); *A61G 5/10* (2013.01)
(58) Field of Classification Search
  CPC .................................. B60S 1/68; A61G 5/10
  See application file for complete search history.

(56) References Cited

U.S. PATENT DOCUMENTS

| | | | |
|---|---|---|---|
| 1,272,352 A * | 7/1918 | Allen | B60S 1/68 280/855 |
| 8,427,288 B2 | 4/2013 | Scofield | |
| 9,882,319 B2 | 1/2018 | Kageta | |
| 10,311,315 B2 | 6/2019 | Drazan | |
| 10,486,597 B1 | 11/2019 | Lynam | |
| 2014/0284911 A1 * | 9/2014 | Kueppers | B60S 1/685 280/855 |
| 2019/0275941 A1 | 9/2019 | Lu | |
| 2021/0291794 A1 * | 9/2021 | Paad | A61G 5/1054 |
| 2021/0394240 A1 * | 12/2021 | Ayres | B08B 1/002 |

FOREIGN PATENT DOCUMENTS

| | | | | |
|---|---|---|---|---|
| DE | 570645 C | * | 2/1933 | ............... B60S 1/68 |
| FR | 725684 A | * | 5/1932 | ............... B60S 1/68 |
| WO | WO2018189342 | | 10/2018 | |

* cited by examiner

*Primary Examiner* — Bryan A Evans

(57) ABSTRACT

A wheelchair wheel cleaning assembly includes a clamp that has a space integrated therein to insertably receive a frame of a wheelchair. A pair of fasteners is each extendable through the clamp to attach the clamp to the wheelchair. A lever is pivotally coupled to the clamp and the lever is positionable between an engaging position and a disengaging position. An arm is coupled to and extends laterally away from the lever and a leg is in communication with the lever. An arm scrubber is disposed on the arm to scrub the rear wheel of the wheelchair when the lever is in the engaging position. A leg scrubber is disposed on the leg to scrub the front wheel of the wheelchair when the lever is in the engaging position.

16 Claims, 7 Drawing Sheets

WHEELCHAIR WHEEL CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheel cleaning device and more particularly pertains to a new wheel cleaning device for scrubbing wheels on a wheelchair. The assembly includes a lever and a pair of scrubbers that is each attached to the lever. Each of the scrubbers engages a respective front wheel and rear wheel of the wheelchair when the lever is manipulated. In this way the front wheel and the rear wheel are cleaned of mud, dirt and debris.

(2) Description of Related Art Including Information Disclosed Under 37 CFR 1.97 and 1.98

The prior art relates to wheel cleaning devices including a wheel cleaning device for a wheel chair that has a curved arm, having bristles therein, that compresses against a wheel on a wheelchair for cleaning the wheel. The prior art discloses a wheel sweeper that includes a bracket, having bristles positioned therein, that is fixedly mounted to a wheel for continually scrubbing the wheel. The prior art further discloses a variety of wheel scrubbers that are fixedly mounted to a wheelchair for continuously scrubbing a wheel on a wheelchair.

BRIEF SUMMARY OF THE INVENTION

An embodiment of the disclosure meets the needs presented above by generally comprising a clamp that has a space integrated therein to insertably receive a frame of a wheelchair. A pair of fasteners is each extendable through the clamp to attach the clamp to the wheelchair. A lever is pivotally coupled to the clamp and the lever is positionable between an engaging position and a disengaging position. An arm is coupled to and extends laterally away from the lever and a leg is in communication with the lever. An arm scrubber is disposed on the arm to scrub the rear wheel of the wheelchair when the lever is in the engaging position. A leg scrubber is disposed on the leg to scrub the front wheel of the wheelchair when the lever is in the engaging position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a perspective view of a wheelchair wheel cleaning assembly according to an embodiment of the disclosure.

FIG. 1a perspective view of a bracket and a set of third scrubbers of an embodiment of the disclosure.

DETAILED DESCRIPTION OF THE INVENTION

Figure 1:
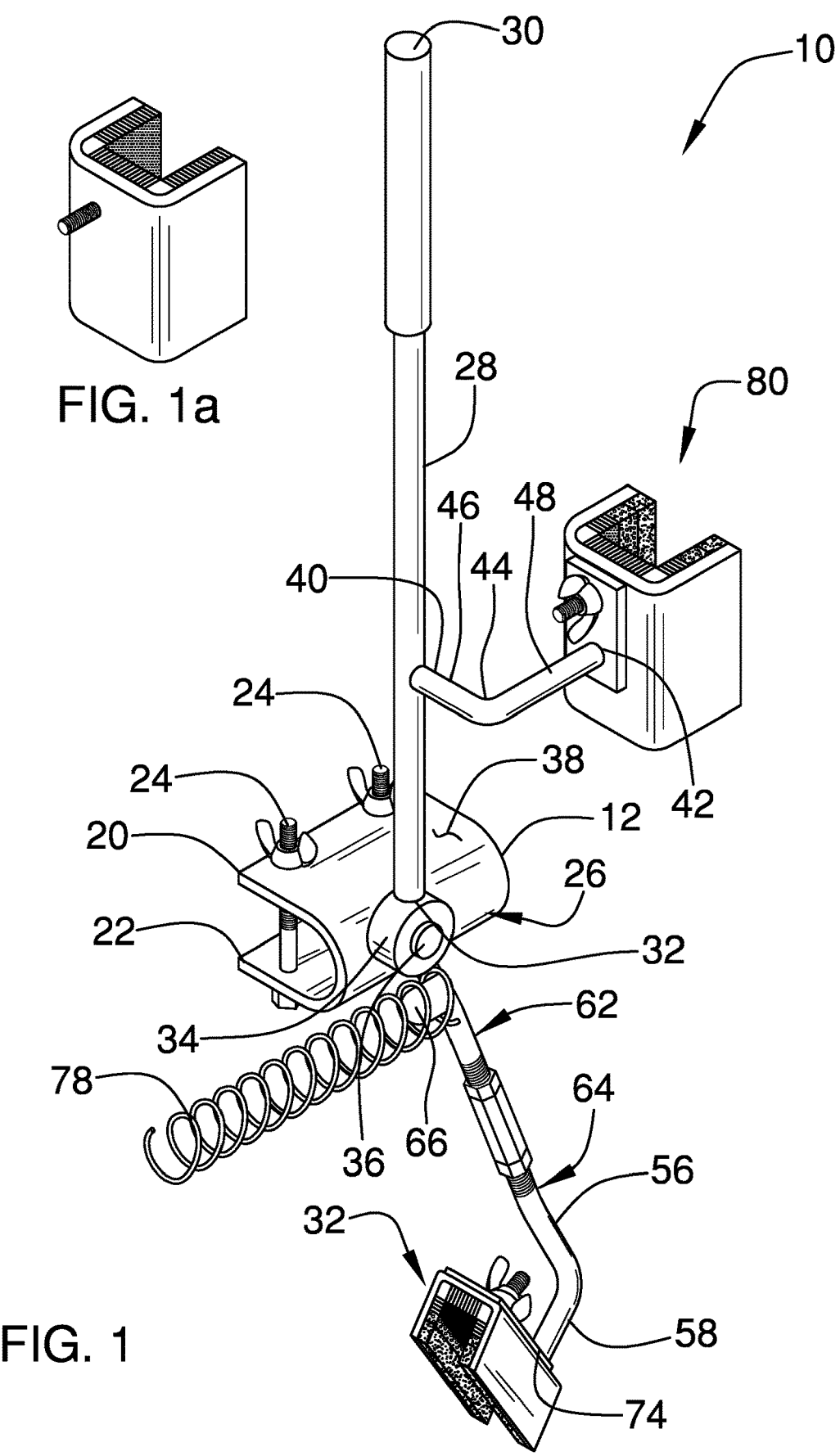
Figure 2:
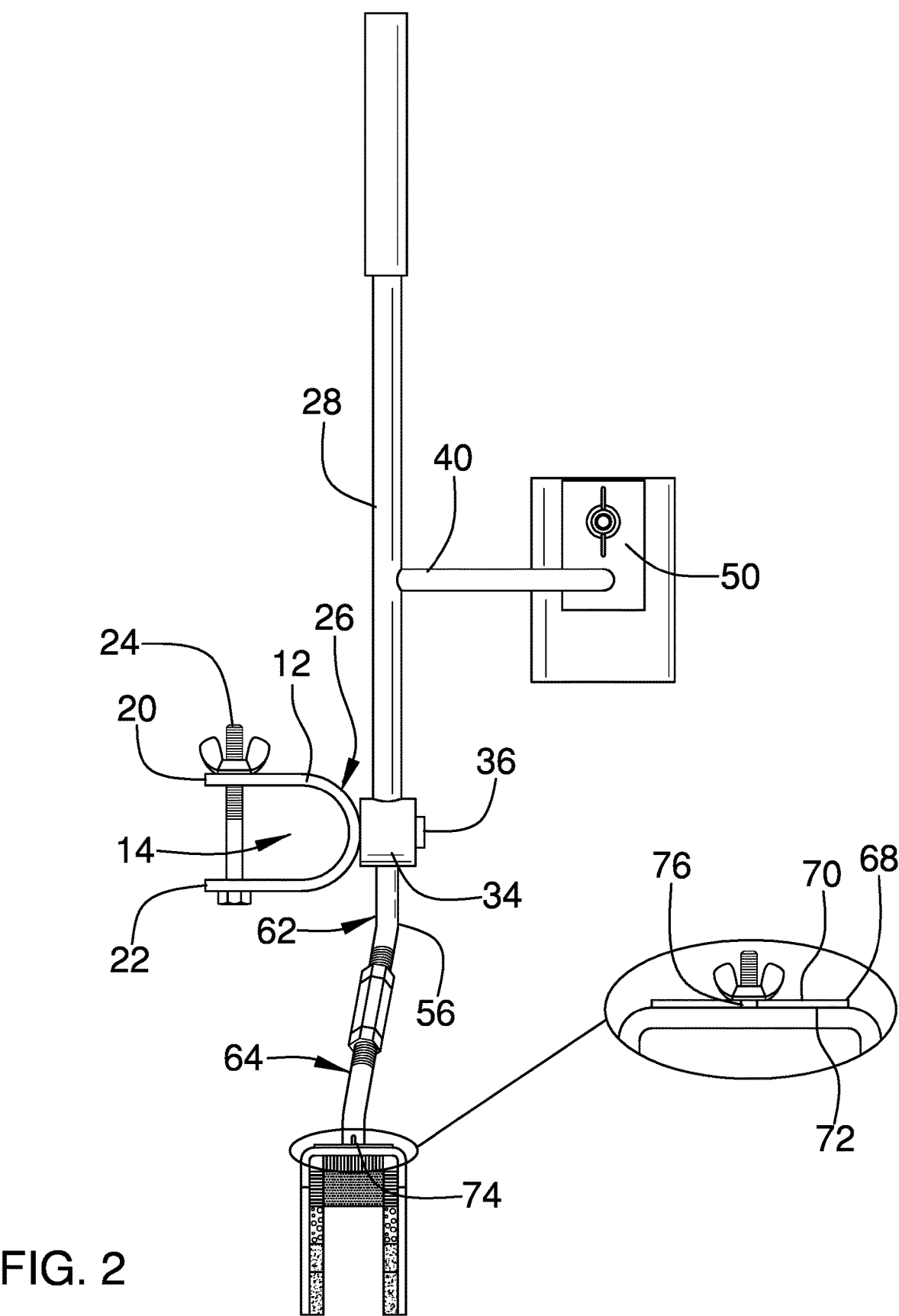
FIG. 2 is a front view of an embodiment of the disclosure.
Figure 3:
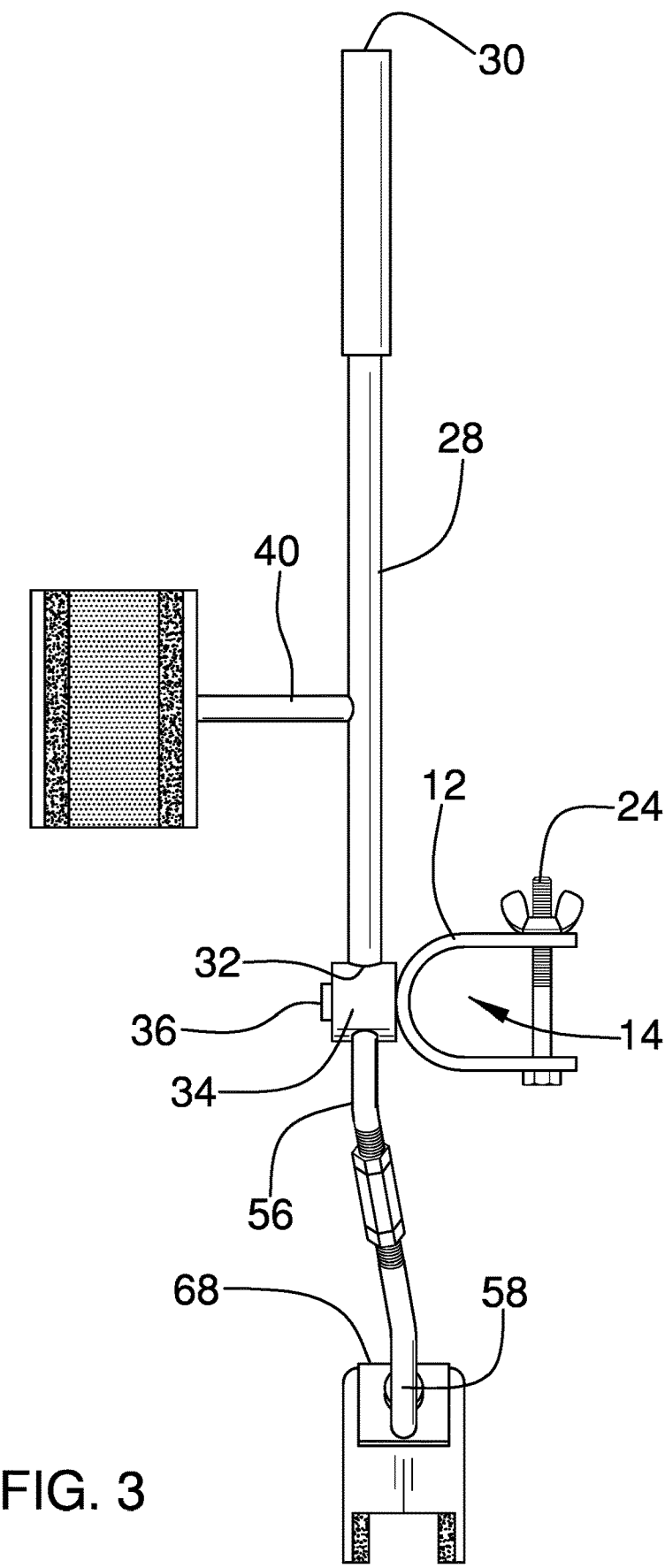
FIG. 3 is a back view of an embodiment of the disclosure.
Figure 4:
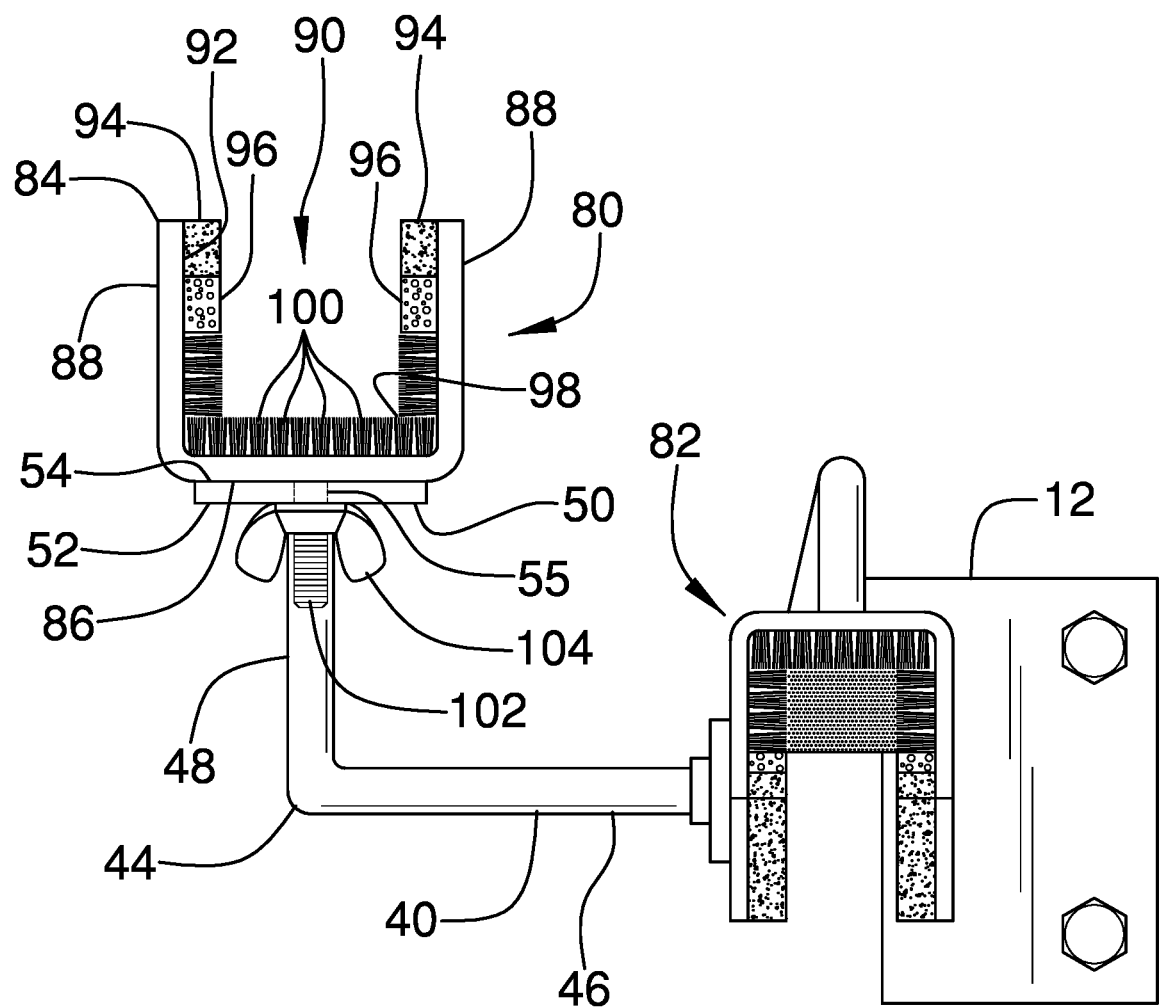
FIG. 4 is a bottom view of an embodiment of the disclosure.
Figure 5:
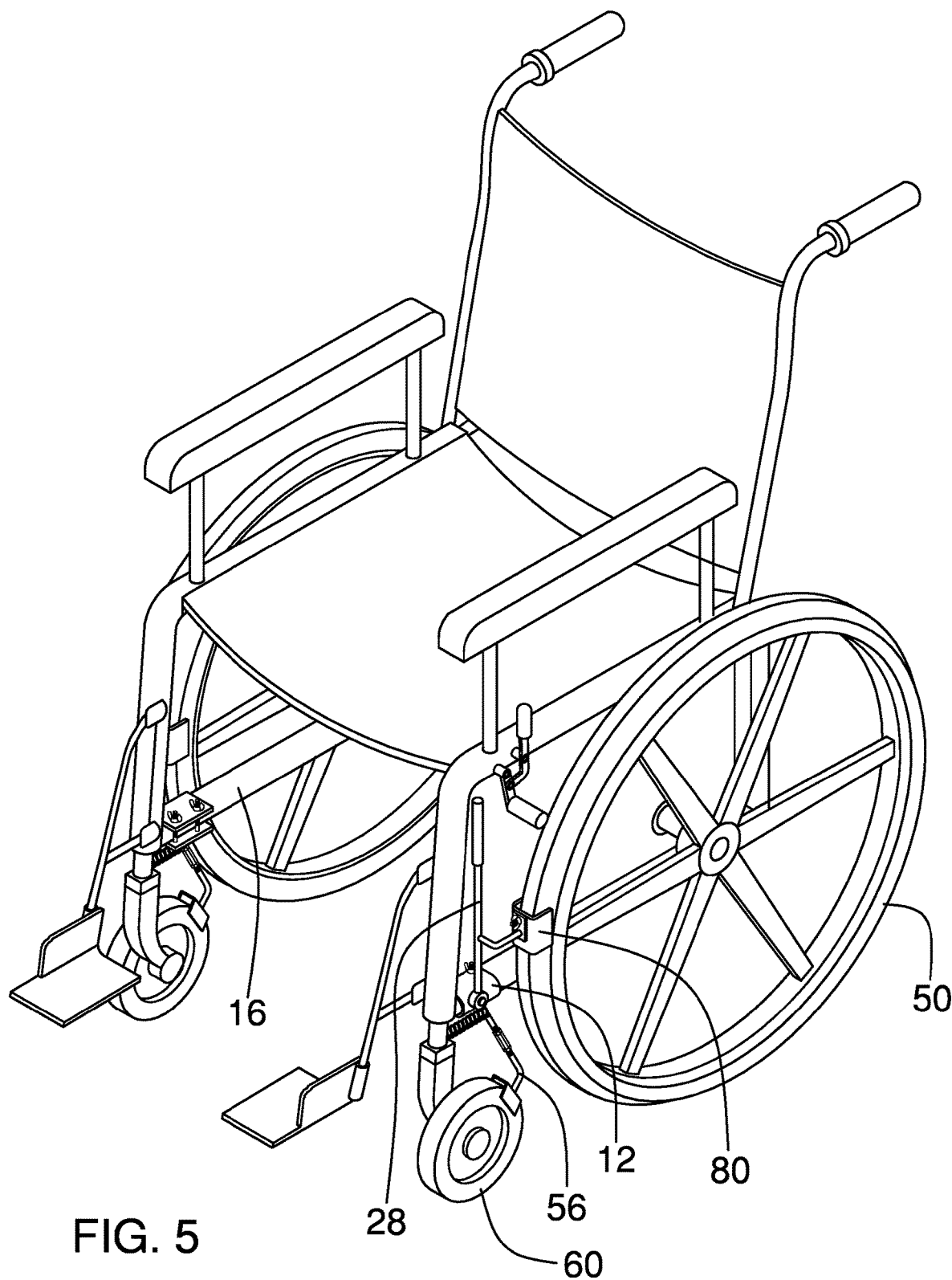
FIG. 5 is a perspective in-use view of an embodiment of the disclosure.
Figure 6:
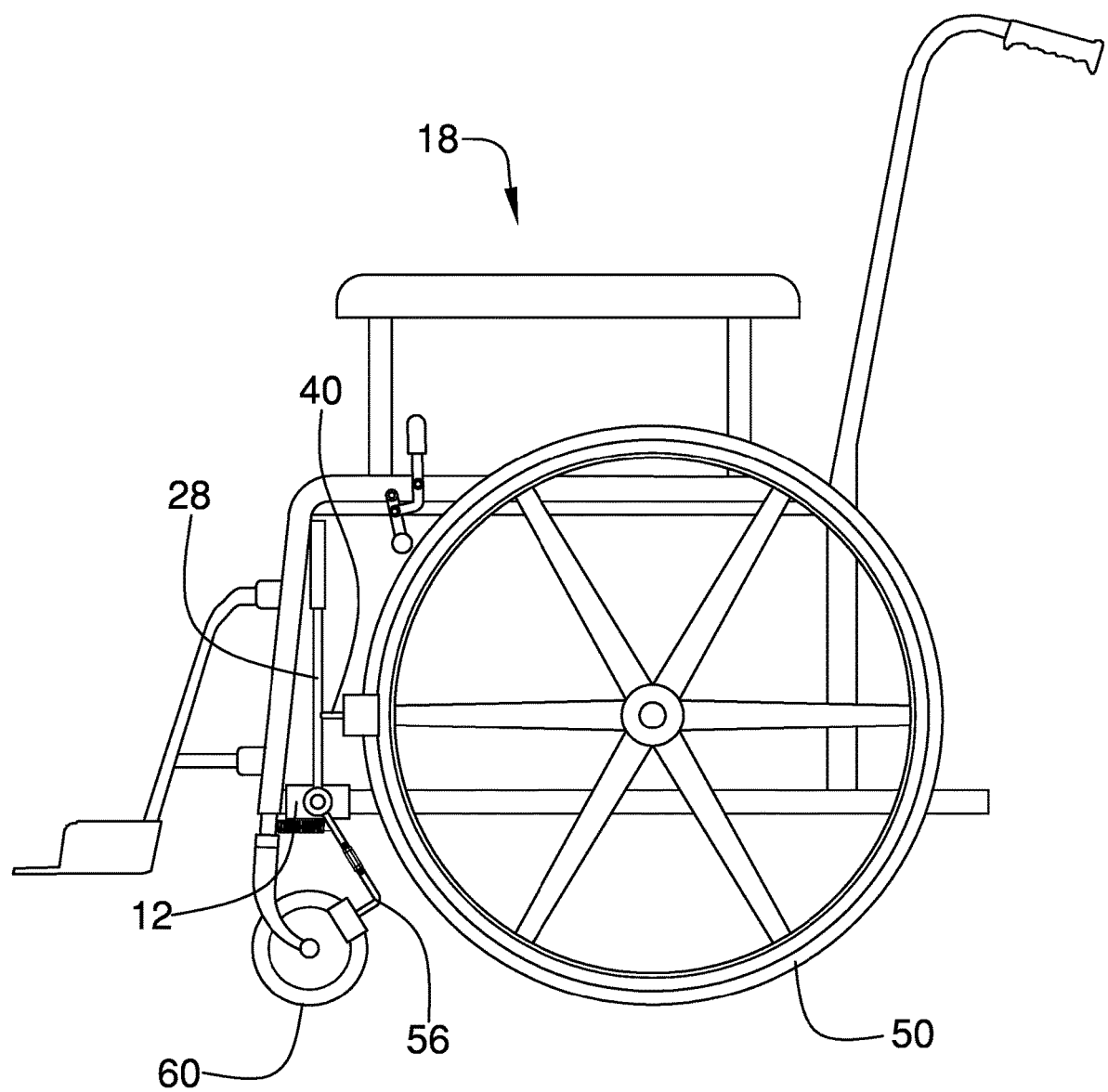
FIG. 6 is a left side in-use view of an embodiment of the disclosure showing a lever in an engaged position.
Figure 7:
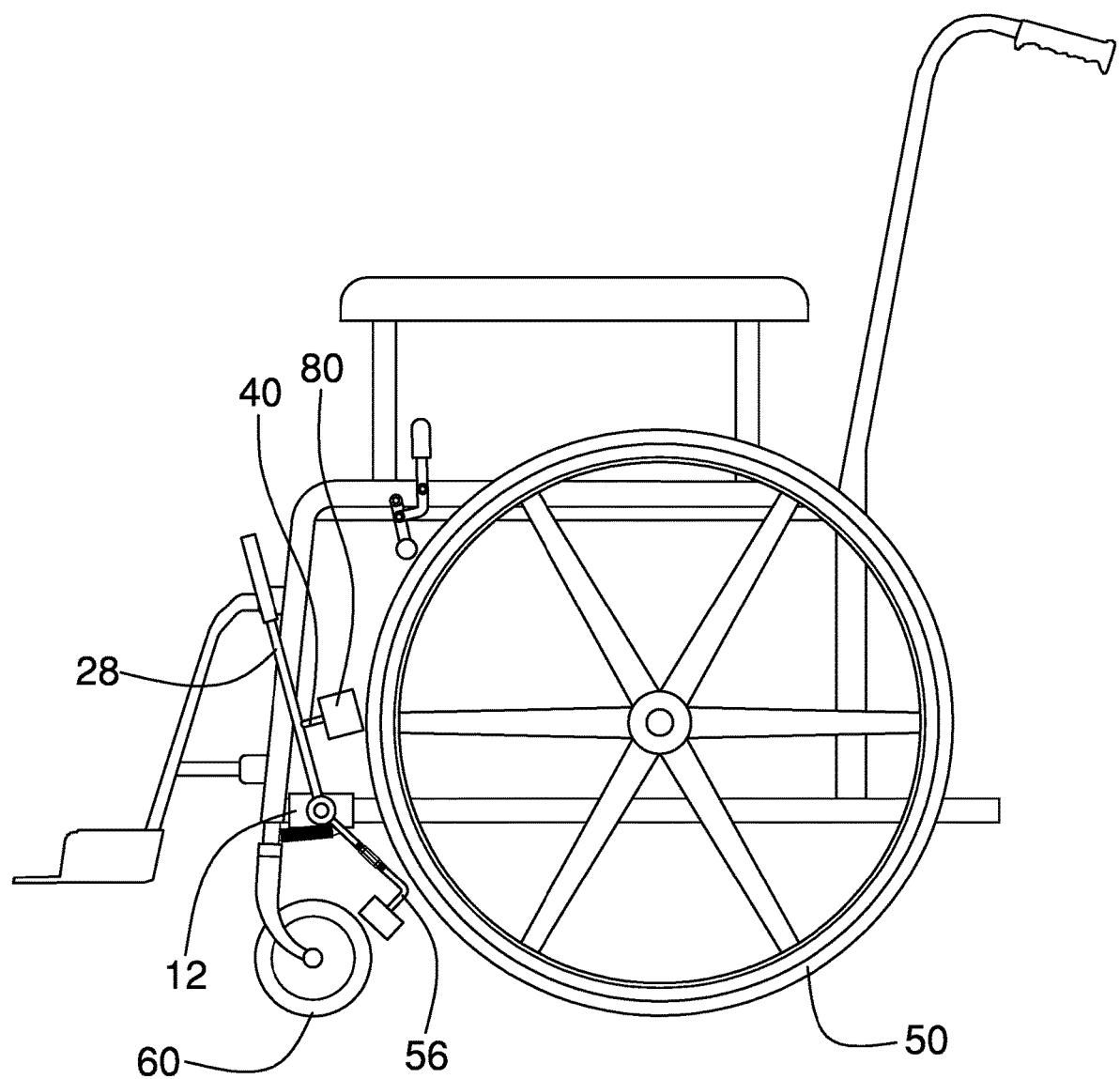
FIG. 7 is a left side in-use view of an embodiment of the disclosure showing a lever in a disengaged position.

With reference now to the drawings, and in particular to FIGS. 1 through 7 thereof, a new wheel cleaning device embodying the principles and concepts of an embodiment of the disclosure and generally designated by the reference numeral 10 will be described.

As best illustrated in FIGS. 1 through 7, the wheelchair wheel cleaning assembly 10 generally comprises a clamp 12 that has a space 14 integrated therein to insertably receive a frame 16 of a wheelchair 18. The wheelchair 18 may be a manual wheelchair, a powered wheelchair or any other type of wheelchair 18. The clamp 12 has a first end 20 and a second end 22, and the clamp 12 is curved between the first end 20 and the second end 22 such that the first end 20 is spaced from the second end 22 to define the space 14 in the clamp 12. A pair of fasteners 24 is provided and each of the fasteners 24 is extendable through the clamp 12 to attach the clamp 12 to the wheelchair 18. Each of the fasteners 24 is positioned adjacent to each of the first end 20 and the second end 22 facilitate the frame 16 of the wheelchair 18 to be positioned between the fasteners 24 and a curve 26 in the clamp 12. Additionally, each of the fasteners 24 may comprise a nut and a bolt.

A lever 28 is pivotally coupled to the clamp 12 thereby facilitating the lever 28 to be manipulated by a user. The lever 28 has a first end 30 and a second end 32, and the second end 32 has a pivot 34 that is coupled thereto. The pivot 34 rotatably engages an engagement 36 on an outer surface 38 of the clamp 12 such that the lever 28 extends upwardly from the clamp 12. The engagement 36 is positioned on the curve 26 in the clamp 12 and the lever 28 is positionable between an engaging position and a disengaging position. An arm 40 is coupled to and extends laterally away from the lever 28 and the arm 40 is positioned between the second end 32 of the lever 28 and the first end 30 of the lever 28.

The arm 40 has a distal end 42 with respect to the lever 28 and the arm 40 has a bend 44 thereon that is positioned between the lever 28 and the distal end 42 to define a first portion 46 of the arm 40 forming an angle with a second portion 48 of the arm 40. The first portion 46 extends laterally away from the lever 28 having the second portion 48 extending rearwardly from the lever 28. In this way the second portion 48 can be directed toward a rear wheel 50 of the wheelchair 18. An arm plate 50 is provided that has a first surface 52 and a second surface 54. The first surface 52 is coupled to the distal end 52 of the arm 40 and the arm plate 50 has an opening 55 extending through the first surface 52 and the second surface 54.

A leg 56 is included and the leg 56 is in communication with the lever 28. The leg 56 is coupled to the pivot such that the leg 56 extends downwardly from the lever 28. Additionally, leg 56 has a foot 58 thereon that is directed forwardly from the leg 56 such that the foot 58 is directed toward a front wheel 60 of the wheelchair 12. The leg 56 comprises a first portion 62 that is threadably coupled to a second portion 64 such that the first portion 62 and the second portion 64 of the leg 56 has an adjustable length. In this way the leg 56 can accommodate a variety of wheelchair designs. The leg 56 has a protrusion 66 extending forwardly therefrom and the protrusion 66 is positioned adjacent to the pivot 34 on the lever 28.

A leg plate 68 is provided that has a first surface 70 and a second surface 72. The first surface 70 of the leg plate 68 is coupled to an end 74 of the foot 58 on the leg 56. Additionally, the leg plate 68 has an opening 76 extending through the first surface 70 and the second surface 72 of the leg plate 68. A biasing member 78 extends away from the leg 56 to engage the frame 16 of the wheelchair 18. The biasing member 78 is compressed when the lever 28 is urged into the engaging position thereby facilitating the lever 28 to be biased into the disengaging position. Additionally, the biasing member 78 engages the protrusion 66 on the leg 56.

An arm scrubber 80 is disposed on the arm 40 such that that arm 40 is aligned with the rear wheel 50 of the wheelchair 18. The arm scrubber 80 is urged rearwardly when the lever 28 is positioned in the engaging position. In this way the arm scrubber 80 can scrub mud, dirt and other debris from the rear wheel 50 of the wheelchair 18. A leg scrubber 82 is disposed on the leg 56 such that the leg scrubber 82 is aligned with the front wheel 60 of the wheelchair 18. The leg scrubber 82 is urged forwardly when the lever 28 is positioned in the engaging position. In this way the leg scrubber 82 can scrub mud, dirt and other debris the front wheel 60 of the wheelchair 18.

Each of the arm scrubber 80 and the leg scrubber 82 comprises a bracket 84 which comprises a central portion 86 extending between a pair of outer portions 88. The outer portions 88 are spaced apart from each other to define wheel space 90 between the outer portions 88, and the bracket 84 has a first surface 92. Each of the arm scrubber 80 and the leg scrubber 82 includes a pair of first scrubbers 94. Each of the first scrubbers 94 is positioned on the first surface 92 of the bracket 84 corresponding to a respective one of the outer portions 88 of the bracket 84. In this way each of the first scrubbers 94 corresponding to the arm scrubber 80 can scrub the rear wheel 50 and each of the first scrubbers 94 corresponding to the leg scrubber 82 can scrub the front wheel 60. Each of the first scrubbers 94 may comprise a micro fiber scrubber.

Each of the arm scrubber 80 and the leg scrubber 82 includes a pair of second scrubbers 96. Each of the second scrubbers 96 is positioned on the first surface 92 of the bracket 84 corresponding to a respective one of the outer portions 88 of the bracket 84. In this way each of the second scrubbers 96 corresponding to the arm scrubber 80 can scrub the rear wheel 50 and each of the second scrubbers 96 corresponding to the leg scrubber 82 can scrub the front wheel 60. Each of the second scrubbers 96 may comprise a foam scrubber or other type of material that is unique from the first scrubbers 94.

Each of the arm scrubber 80 and the leg scrubber 82 includes a set of third scrubbers 98. The set of third scrubbers 98 is positioned on the first surface of the bracket 84 corresponding to the central portion 86 and each of the outer portions 88. In this way the set of third scrubbers 98 corresponding to the arm scrubber 80 can scrub the rear wheel 50 and the set of third scrubbers 98 corresponding to the leg scrubber 82 can scrub the front wheel 60. The set of third scrubbers 98 may comprise a plurality of bristles 100 such that the set of third scrubbers 98 defines a brush. As is most clearly shown in FIG. 1*a*, only the third scrubbers 98 may be present on the bracket 84.

Each of the arm scrubber 80 and the leg scrubber 82 includes a screw 102 that is coupled to and extends away from the central portion 86 of the bracket 84. The screw 102 corresponding to the arm scrubber 80 is extendable through the opening in the arm plate 50. The screw 102 corresponding to the leg scrubber 82 is extendable through the opening in the leg plate 68. Each of the arm scrubber 80 and the leg scrubber 82 includes a nut 104 that is threadable onto the screw 102. The nut 104 corresponding to the arm scrubber 80 retains the bracket 84 corresponding to the arm scrubber 80 on the arm plate 50. Additionally, the nut 104 corresponding to the leg scrubber 82 retains the bracket 84 corresponding to the leg scrubber 82 on the leg plate 68.

In use, the clamp 12 is attached to the frame 16 of the wheelchair 18 thereby aligning the leg scrubber 82 with the front wheel 60 and aligning the arm scrubber 80 with the rear wheel 50. The lever 28 is urged into the engaging position to engage the arm scrubber 80 on the rear wheel 50 and to engage the leg scrubber 82 on the front wheel 60. In this way each of the rear wheel 50 and the rear wheel 50 can be scrubbed or mud, dirt and debris prior to entering a building, for example, thereby reducing the likelihood that the mud, dirt and debris will be tracked into the building by the wheelchair 18. The biasing member biases the lever 28 into the disengaging position when the lever 28 is released. A pair of the wheelchair wheel cleaning assembles 10 may be provided, each being mounted on opposite sides of the wheelchair 18 to facilitate all four wheels of the wheelchair 18 to be scrubbed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheelchair wheel cleaning assembly for cleaning wheels on a wheelchair, said assembly comprising:
a clamp having a space being integrated therein wherein said space is configured to insertably receive a frame of a wheelchair;
a pair of fasteners, each of said fasteners being extendable through said clamp wherein said fasteners are configured to attach said clamp to the wheelchair;
a lever being pivotally coupled to said clamp wherein said lever is configured to be manipulated by a user, said lever being positionable between an engaging position and a disengaging position;
an arm being coupled to and extending laterally away from said lever;
a leg being in communication with said lever;
an arm scrubber being disposed on said arm wherein said arm scrubber is configured to be aligned with the rear wheel of the wheelchair, said arm scrubber being urged rearwardly when said lever is positioned in said engaging position wherein said arm scrubber is configured to scrub the rear wheel of the wheelchair; and
a leg scrubber being disposed on said leg wherein said leg scrubber is configured to be aligned with the front wheel of the wheelchair, said leg scrubber being urged forwardly when said lever is positioned in said engaging position wherein said leg scrubber is configured to scrub the front wheel of the wheelchair.

2. The assembly according to claim 1, wherein:
said clamp has a first end and a second end, said clamp being curved between said first end and said second end such that said first end is spaced from said second end to define said space in said clamp; and
each of said fasteners is positioned adjacent to each of said first end and said second end wherein said fasteners are configured to facilitate the frame of the wheelchair to be positioned between said fasteners and a curve in said clamp.

3. The assembly according to claim 2, wherein said lever has a first end and a second end, said second end having a pivot being coupled thereto, said pivot rotatably engaging an engagement on an outer surface of said clamp such that said lever extends upwardly from said clamp, said engagement being positioned on said curve in said clamp.

4. The assembly according to claim 3, wherein said arm is positioned between said second end of said lever and said first end of said lever, said arm having a distal end with respect to said lever, said arm having a bend thereon being positioned between said lever and said distal end to define a first portion of said arm forming an angle with a second portion of said arm, said first portion extending laterally away from said lever having said second portion extending rearwardly from said lever wherein said second portion is configured to be directed toward a rear wheel of the wheelchair.

5. The assembly according to claim 4, further comprising an arm plate having a first surface and a second surface, said first surface being coupled to said distal end of said arm, said arm plate having an opening extending through said first surface and said second surface.

6. The assembly according to claim 3, wherein said leg is coupled to said pivot such that said leg extends downwardly from said lever, leg having a foot thereon being directed forwardly from said leg wherein said foot is configured to be directed toward a front wheel of the wheel chair.

7. The assembly according to claim 6, wherein said leg comprises a first portion being threadably coupled to a second portion such that said first portion and said second portion of said leg has an adjustable length wherein said leg is configured to accommodate a variety of wheelchair designs.

8. The assembly according to claim 6, further comprising a leg plate having a first surface and a second surface, said first surface of said leg plate being coupled to an end of said foot on said leg, said leg plate having an opening extending through said first surface and said second surface of said leg plate.

9. The assembly according to claim 6, wherein:
said leg has a protrusion extending forwardly therefrom, said protrusion being positioned adjacent to said pivot; and
said biasing member engages said protrusion on said leg.

10. The assembly according to claim 1, wherein each of said arm scrubber and said leg scrubber comprises a bracket comprising a central portion extending between a pair of outer portions, said outer portions being spaced apart from each other to define wheel space between said outer portions, said bracket having a first surface.

11. The assembly according to claim 10, wherein each of said arm scrubber and said leg scrubber includes a pair of first scrubbers, each of said first scrubbers being positioned on said first surface of said bracket corresponding to a respective one of said outer portions of said bracket wherein each of said first scrubbers corresponding to said arm scrubber is configured to scrub the rear wheel and each of said first scrubbers corresponding to said leg scrubber is configured to scrub the front wheel.

12. The assembly according to claim 11, wherein each of said arm scrubber and said leg scrubber includes a pair of second scrubbers, each of said second scrubbers being positioned on said first surface of said bracket corresponding to a respective one of said outer portions of said bracket wherein each of said second scrubbers corresponding to said arm scrubber is configured to scrub the rear wheel and each of said second scrubbers corresponding to said leg scrubber is configured to scrub the front wheel.

13. The assembly according to claim 12, wherein each of said arm scrubber and said leg scrubber includes a set of third scrubbers, said set of third scrubbers being positioned on said first surface of said bracket corresponding to said central portion and each of said outer portions wherein said set of third scrubbers corresponding to said arm scrubber is configured to scrub the rear wheel and said set of third scrubbers corresponding to said leg scrubber is configured to scrub the front wheel.

14. The assembly according to claim 13, wherein:
said assembly includes an arm plate, said arm plate having an opening extending therethrough;
said assembly includes a leg plate, said leg plate having an opening extending therethrough; and
each of said arm scrubber and said leg scrubber includes a screw being coupled to and extending away from said central portion of said bracket, said screw corresponding to said arm scrubber being extendable through said opening in said arm plate, said screw corresponding to said leg scrubber being extendable through said opening in said leg plate.

15. The assembly according to claim 14, wherein each of said arm scrubber and said leg scrubber includes a nut being threadable onto said screw, said nut corresponding to said arm scrubber retaining said bracket corresponding to said arm scrubber on said arm plate, said nut corresponding to said leg scrubber retaining said bracket corresponding to said leg scrubber on said leg plate.

16. A wheelchair wheel cleaning assembly for cleaning wheels on a wheelchair, said assembly comprising:
a clamp having a space being integrated therein wherein said space is configured to insertably receive a frame of a wheelchair, said clamp having a first end and a second end, said clamp being curved between said first end and said second end such that said first end is spaced from said second end to define said space in said clamp;
a pair of fasteners, each of said fasteners being extendable through said clamp wherein said fasteners are configured to attach said clamp to the wheelchair, each of said fasteners being positioned adjacent to each of said first end and said second end wherein said fasteners are configured to facilitate the frame of the wheelchair to be positioned between said fasteners and a curve in said clamp;
a lever being pivotally coupled to said clamp wherein said lever is configured to be manipulated by a user, said lever having a first end and a second end, said second end having a pivot being coupled thereto, said pivot rotatably engaging an engagement on an outer surface of said clamp such that said lever extends upwardly from said clamp, said engagement being positioned on said curve in said clamp, said lever being positionable between an engaging position and a disengaging position;
an arm being coupled to and extending laterally away from said lever, said arm being positioned between said second end of said lever and said first end of said lever, said arm having a distal end with respect to said lever, said arm having a bend thereon being positioned between said lever and said distal end to define a first portion of said arm forming an angle with a second portion of said arm, said first portion extending laterally away from said lever having said second portion extending rearwardly from said lever wherein said second portion is configured to be directed toward a rear wheel of the wheelchair;
an arm plate having a first surface and a second surface, said first surface being coupled to said distal end of said arm, said arm plate having an opening extending through said first surface and said second surface;
a leg being in communication with said lever, said leg being coupled to said pivot such that said leg extends downwardly from said lever, leg having a foot thereon being directed forwardly from said leg wherein said foot is configured to be directed toward a front wheel of the wheel chair, said leg comprising a first portion being threadably coupled to a second portion such that said first portion and said second portion of said leg has an adjustable length wherein said leg is configured to accommodate a variety of wheelchair designs, said leg having a protrusion extending forwardly therefrom, said protrusion being positioned adjacent to said pivot;
a leg plate having a first surface and a second surface, said first surface of said leg plate being coupled to an end of said foot on said leg, said leg plate having an opening extending through said first surface and said second surface of said leg plate;
a biasing member extending away from said leg wherein said biasing is configured to engage the frame of the wheelchair, said biasing member being compressed when said lever is urged into said engaging position thereby facilitating said lever to be biased into said disengaging position, said biasing member engaging said protrusion on said leg;
an arm scrubber being disposed on said arm wherein said arm scrubber is configured to be aligned with the rear wheel of the wheelchair, said arm scrubber being urged rearwardly when said lever is positioned in said engaging position wherein said arm scrubber is configured to scrub the rear wheel of the wheelchair; and
a leg scrubber being disposed on said leg wherein said leg scrubber is configured to be aligned with the front wheel of the wheelchair, said leg scrubber being urged forwardly when said lever is positioned in said engaging position wherein said leg scrubber is configured to scrub the front wheel of the wheelchair, each of said arm scrubber and said leg scrubber comprising:
  a bracket comprising a central portion extending between a pair of outer portions, said outer portions being spaced apart from each other to define wheel space between said outer portions, said bracket having a first surface;
  a pair of first scrubbers, each of said first scrubbers being positioned on said first surface of said bracket corresponding to a respective one of said outer portions of said bracket wherein each of said first scrubbers corresponding to said arm scrubber is configured to scrub the rear wheel and each of said first scrubbers corresponding to said leg scrubber is configured to scrub the front wheel;
  a pair of second scrubbers, each of said second scrubbers being positioned on said first surface of said bracket corresponding to a respective one of said outer portions of said bracket wherein each of said second scrubbers corresponding to said arm scrubber is configured to scrub the rear wheel and each of said second scrubbers corresponding to said leg scrubber is configured to scrub the front wheel;
  a set of third scrubbers, said set of third scrubbers being positioned on said first surface of said bracket corresponding to said central portion and each of said outer portions wherein said set of third scrubbers corresponding to said arm scrubber is configured to scrub the rear wheel and said set of third scrubbers corresponding to said leg scrubber is configured to scrub the front wheel;
  a screw being coupled to and extending away from said central portion of said bracket, said screw corresponding to said arm scrubber being extendable through said opening in said arm plate, said screw corresponding to said leg scrubber being extendable through said opening in said leg plate; and a nut being threadable onto said screw, said nut corresponding to said arm scrubber retaining said bracket corresponding to said arm scrubber on said arm plate, said nut corresponding to said leg scrubber retaining said bracket corresponding to said leg scrubber on said leg plate.

\* \* \* \* \*